United States Patent Office 3,354,579
Patented Nov. 28, 1967

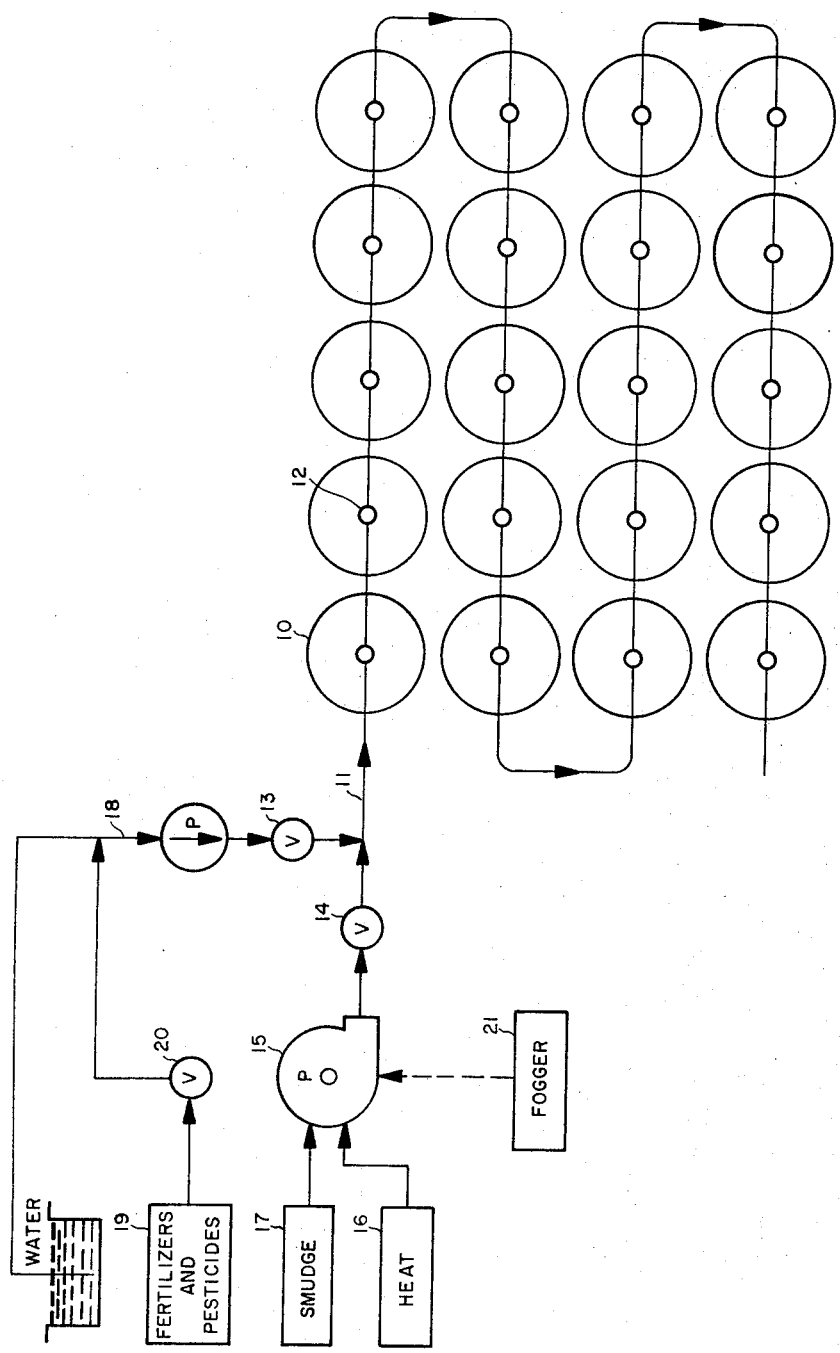

3,354,579
SYSTEM FOR THE PREVENTION OF
FROST DAMAGE
William L. C. Gross, 424 W. Minnehaha Ave., Clermont, Fla. 32711, and Oscar Herbert Stone, Rte. 1, Box 1182, Tavares, Fla. 32778
Filed May 18, 1966, Ser. No. 558,158
4 Claims. (Cl. 47—2)

This invention relates to a method for preventing damage to fruit trees from low winter temperatures.

Injury by low winter temperatures is one of the greatest factors limiting an area in the production of citrus fruits. Frosts and freezes decrease profits since groves which have been injured by them cannot be operated at their greatest efficiency. In addition to loss of fruit immediately following a freeze, there may be decreased crops for several years.

In the past, numerous methods have been utilized in an attempt to prevent freeze damage to citrus trees and fruit. Covering trees with tents, canvas or the like has been suggested, but generally has proved to be impractical. Another more recent and still experimental method for preventing freeze damage is the use of wind machines. These machines are essentially a large airplane type propeller being driven by a power source attempting to stir up the air to mix the lower stratified cold air with warmer air at higher levels. Finally, heating of the groves and trees has been commonly used. This has been done by building large fires in the groves or by placing heating apparatus in the groves. To prevent the loss of radiant energy from the trees and fruit, smudge fires which produce dense black smoke by incomplete combustion of fires, or the like, have also been used. This increases the efficiency of the heating of the surrounding ambient temperature. While this method has met with some success, it requires considerable labor, requires the heating and smudging means to be placed in the open rather than under the trees, and results in considerable loss of rising heat energy.

The present invention involves a method of utilizing an underground conduit system for prevention of fruit and fruit tree damage, from freezing temperatures by forcing a mixture of smudge and heated air to the underside of each tree via an underground pipe system. The smudge forms a dense screen of heavy black smoke encircling the tree and prevents the escape of radiant energy toward the sky, while the hot air raises the ambient temperature around the tree and also the material used for conduit conducts heat to the ground under the trees to prevent loss of radiant energy from the earth.

The heat and smudge are advantageously supplied directly beneath the tree where, by rising directly into the foliage of the tree, they are most effective.

The same pipe system may be used to convey irrigation water, fertilizer and even pesticides, to each tree the year round. An alternate method of my invention includes conducting water to each tree through the same pipe system. This assists in warming the earth around each tree to prevent loss of radiant heat. The moisture in the earth vaporizes in the surrounding air and assists the ambient temperature around the tree by giving up heat upon condensation.

Accordingly, an object of the present invention is to provide a method for effectively preventing freeze damage to citrus fruit and trees, while utilizing a piping system that may also be used for irrigation, fertilization or the like.

Other objects, features, and advantages of this invention will be apparent from a study of the written description and the drawing in which:

FIGURE 1 shows a typical layout of a pipe system which may be utilized with our process.

Referring to FIGURE 1, there is shown a layout for a piping system that is located beneath the surface of the earth and which passes under a fruit tree grove. The pipe 11 passes directly beneath each tree 10 in the grove and has at least one outlet 12 located under the foliage of each tree. Any type of pipe may be used in the piping system but we prefer to use a standard size pipe commercially available in materials such as ceramics, plastics, cast iron aluminum or poured concrete. The type of pipe used will vary depending upon the cost within the location as well as the size desired. The size varies with the size of the orchard being protected and the type of pumping means being used to force the smudge and heated air through the pipe.

Each opening 12 may be left uncovered but it is desirable to provide covered openings which may be opened to allow the smudge and heat being forced through the system to escape under the canopy of the tree. It is also contemplated that telescoping pipe may be used at each opening to allow cultivation of the trees without removal of outlets without departing from the spirit and scope of the invention.

A smudge generator 17 and heating apparatus 16 are illustrated by blocks each feeding into the pumping system 15. Heated air can be generated by the combustion of fuel oil, wood, gas or the like, in a furnace. The type of fuel will normally depend upon the economics of fuels in a particular area. The smudge is usually generated separate from the heated air since combustion that produces smudge does not normally produce a substantial amount of heat. Smudge may be created by burning old used rubber tires, saw dust, oil waste, or by smudge pots which produce smudge by the incomplete combustion of fuels. It is possible, however, to have one generating means for producing heat and smudge. This might operate by having a heating furnace to which a smudging oil has been added. At any rate the heat and smudge are mixed by the pumping system 15 which forces the mixture through the piping system to each tree. In the event a very large grove is to be protected, it may be necessary to have more than one smudge and heat generating station installed at intervals in the piping system. This will assure a rapid supply of dense smoke throughout the grove.

The pumping system 15 may be an electric motor driven blower which turns an impeller to force the air through the pipes 11 but any air pumping means may be utilized. A forced air system is preferred since this allows smaller pipes to be used in the piping system and better directs the smudge and heated air into the foliage of the trees.

The piping system 11 may have appropriate connections such as valves 13 and 14 to connect a source of water 18 to the piping system 11 and to separate this source from the pumping system 15. These valves may be common types of simple control valves such as gate valves or butterfly valves which allow the fluid to flow through the valves in a straight line with a minimum resistance to the flow of the fluid. Water for irrigation may be obtained from any available source such as lakes, or well and need not be treated prior to use. The pipes 11 are preferably perforated so that water may be fed to the earth nearer to the roots of the trees without flooding the surface and eroding the ground around the trees. The irrigation water may have a mixture of water miscible fertilizer or pesticides or fungicides added to it for root feeding and combating soil borne parasites and disease through feeder tank 19 and valve 20. It is also within the realm of this invention to adapt our system for fogging operations by connecting a fogger 21 into the pumping system 15, whereby the same blower and piping system may be used in the control of pests and diseases. This has become especially important with the introduction of safer pesticides utilizing hormones and the like.

Having described the apparatus used for my method, in conjunction with FIGURE 1, we will now explain in more detail the method of our invention. Generally, the present invention involves generating smudge and heat in a smudge generator 17 and air heating means 16 respectively and intermingling this smudge and heat in the air pumping system 15, then forcing the mixture through the pipes 11 and out each opening 12 under each tree 10. An alternate method would include the pumping of water through the piping system prior to the heating and smudge.

Most citrus fruits are safe from damage from freezing temperatures until they near a temperature of approximately 28 degrees Fahrenheit. It has been found desirable to try to maintain the temperature around the trees at around 30 degrees Fahrenheit until the normal outside temperature rises above this point. We have found that our method is effective in protecting citrus fruits and trees during freezes.

When the ambient temperature in a grove has fallen to below freezing the smudge generators and the air heating generators must be started and run until smudge and heated air are being produced. We next actuate the pumping means which draws the smudge and heat from the respective generators, and intermingles them in the pumping means prior to forcing the mixture through the underground piping system and under each tree via the openings thereunder. The smudge and heat bellow forth into the foliage of the trees being forced upward by the force from the pumping means and by the tendency of heat to rise. A cloud of heat mixed with heavy black smoke is thus produced around the tree. The smudge helps retain the heat mixed with it close to the trees rather than having the heat dissipate by rapidly rising into the cold night air. In addition the smudge prevents loss of heat by its radiating skyward from the trees and surrounding earth. The smudge also spreads the heat over a larger area than when heat alone is used since the heat would otherwise rise straight up. The smudge holds the heat close to the earth and allows it to spread over a large area around the trees. This provides a decided advantage over prior methods using only heat or only smudge. In fact, our experiments have shown that heated air of twice the intensity would not produce the protection from freezing temperatures that is achieved by mixing the heat and dense smudge utilized in our system.

It has been repeatedly observed that citrus trees suffer more from cold weather if the preceding period has been dry. This added injury results from several causes such as a reduced resistance of the trees by a reduction in the moisture their cells contain. There is also a reduction in the water vapor in the air immediately above the soil which would otherwise check heat radiation and also yield heat upon condensation. Finally, if the surface of the soil is dry, little heat will be conducted downward because dry soil is a very god insulator. If the soil is moist, compact and exposed to the sun, the heat received will be stored in the soil during the course of the day and will conduct heat back up into the under side of the foliage in the evenings.

Consequently, we have provided an alternate method already mentioned, where water may be forced through the pipes to wet the earth around the trees in the grove. This may be done in the evening of the day before the freeze. The worst freezing temperature is usually reached in the very early morning. If this additional step is added to the process, the pipes 11 should preferably be perforated. The valve 13 is opened and the valve 14 is closed so that the water supply system 18 is connected to the main pipe system 11. After the water has soaked the surrounding earth, valve 13 is turned off and valve 14 is turned on. This additional water supply pipe connection allows the present system to be used the year round for irrigation purposes and connection may be added to the water pipe 18 for feeding water soluble fertilizers to the grove, as already mentioned.

Our system and method advantageously makes the operation of a citrus grove or the like a one man operation even during freezes and thus the labor costs of grove operation is substantially reduced.

From the foregoing description, it will be clear that a method has been provided for preventing damage to fruit and fruit trees during freezing winter temperatures.

This invention is not, however, to be construed as limited to the particular forms disclosed herein, since these are to be regarded as illustrative rather than restrictive.

We claim:
1. A method for preventing freeze damage to trees or the like utilizing an underground conduit system comprising the steps of: generating smudge; generating heated air; mixing said smudge and said heated air and conveying said mixture through said conduit system to openings therein, each said opening being located adjacent to a tree in a grove.

2. The method according to claim 1 in which said step of conveying said mixture of smudge and heated air includes forcing said mixture through said conduit system under a positive pressure.

3. A method for preventing damage to orchard trees, or the like, from freezing temperatures and utilizing an underground conduit system comprising the steps of: conveying water through said conduit system to an orchard; switching off said water from said conduit system; generating smudge; generating heated air; mixing said smudge and said heated air; and conveying said mixture of smudge and heated air through said conduit system to said openings in said system.

4. The method according to claim 3 where said conduit system has perforations therein, whereby said water can escape to the surrounding earth.

References Cited

UNITED STATES PATENTS

| | | | |
|---|---|---|---|
| 661,898 | 11/1900 | Tucker | 47—2 |
| 1,035,980 | 8/1912 | Lowry | 47—2 XR |
| 1,688,802 | 10/1928 | Crowhurst | 47—2 |
| 2,185,663 | 1/1940 | Greenstreet et al. | 47—2 |
| 3,123,304 | 3/1964 | Sutton | 239—77 |
| 3,200,539 | 8/1965 | Kelly | 47—1 |

ROBERT E. BAGWILL, *Primary Examiner.*